A. T. KASLEY.
MEANS FOR CONSERVING HEAT.
APPLICATION FILED JULY 7, 1910.
1,025,274.
Patented May 7, 1912.
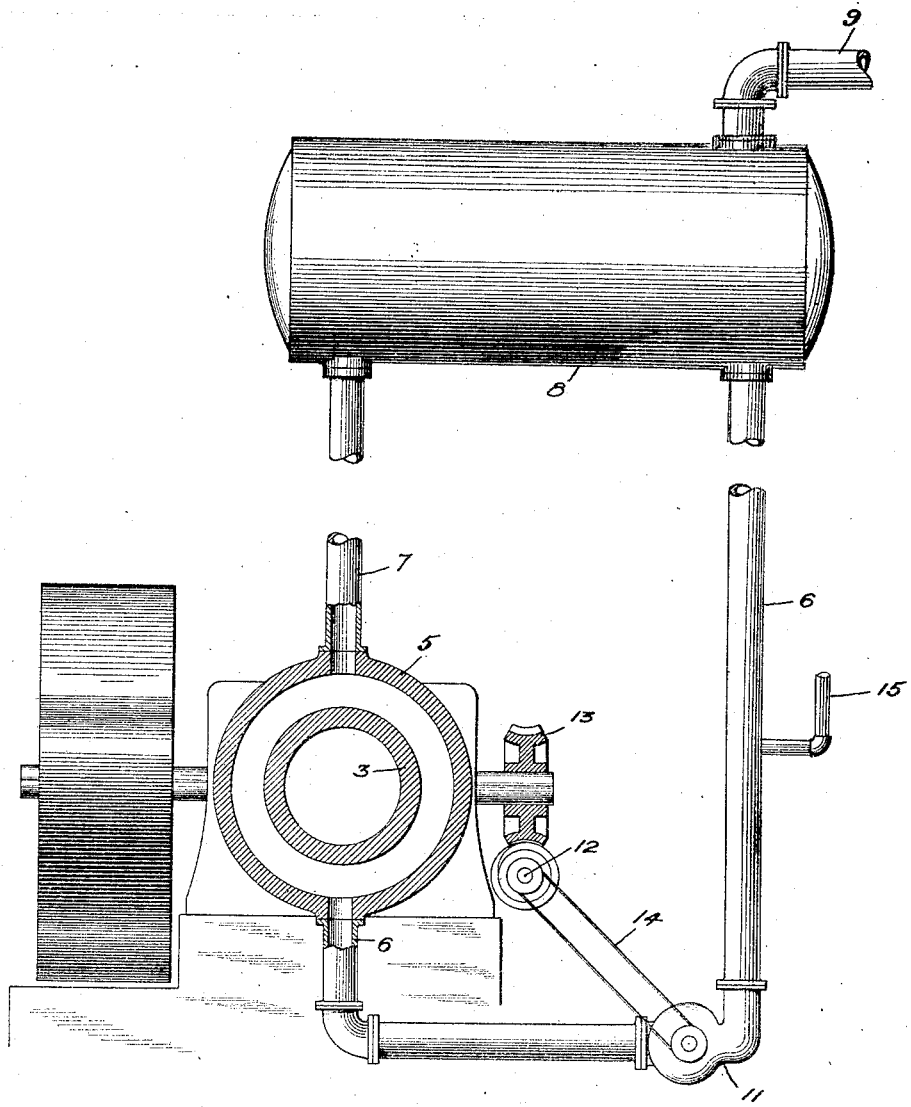

UNITED STATES PATENT OFFICE.

ALEXANDER T. KASLEY, OF SWISSVALE, PENNSYLVANIA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

MEANS FOR CONSERVING HEAT.

1,025,274.  Specification of Letters Patent.  Patented May 7, 1912.

Application filed July 7, 1910. Serial No. 570,795.

*To all whom it may concern:*

Be it known that I, ALEXANDER T. KASLEY, a citizen of the United States, and a resident of Swissvale, in the county of Allegheny and State of Pennsylvania, have made a new and useful Invention in Means for Conserving Heat, of which the following is a specification.

This invention relates to internal combustion engines, and has for an object to produce means for preventing the formation of scale or the deposition of sediment in the cooling passages of such engines.

A further object is to produce means whereby the thermal energy transmitted to the cooling water of the cylinders of an internal combustion engine is employed in generating steam at a pressure capable of being effectively utilized.

A further object is to produce means for cooling the cylinders of an internal combustion engine such that the temperature of the cylinder will be more uniform throughout all its parts.

These and other objects I attain in an apparatus embodying the features herein described and illustrated.

In the drawings accompanying this application and forming a part thereof, I have illustrated diagrammatically an arrangement of apparatus which embodies my invention.

One of the purposes of my invention is to employ a portion of the thermal energy transmitted to the cooling water of the engine cylinders, in the generation of steam at a pressure capable of operating a low pressure condensing engine or turbine. It is well known that engines and turbines may be effectively and efficiently operated with steam of less than atmospheric pressure by employing a condenser with the engine or turbine. In the apparatus illustrated as an embodiment of my invention, I have shown means for generating low pressure steam, and at the same time maintaining the engine cylinders at a safe working temperature. The cylinder 3 of an internal combustion engine is shown in section and is provided with a cooling jacket 5 to which water is admitted through piping 6 and from which water is delivered through piping 7. The piping 6 and 7 communicate with a chamber or tank 8 which may be termed a boiler or steam chamber and which is provided with a steam delivery port and communicating piping 9 adapted to deliver steam to a low pressure engine or turbine, or to any other apparatus utilizing low pressure steam.

The tank 8 is preferably located above the engine cylinder and a circulating pump 11 is located in the piping 6 and is so arranged that it causes a circulation of water from the tank 8 through the piping 6 to the jacket 5 and from the jacket back to the tank through the piping 7. The pump 11 may be driven by any suitable means, as for example, from a shaft 12 operated by the engine shaft through the agency of a gear 13 and which drives the pump by means of a belt 14.

By employing the pump 11 and causing a continuous circulation of water through the jacket 5 or the other cooling passages of the engine, the water is prevented from forming a scale or depositing sediment in the jacket or cooling passages. The major portion of the impurities or sediment in the water will be deposited in the tank 8 in the form of scale or sediment and will produce no injurious effects. Moreover, it may be removed from the tank without difficulty.

It will be apparent that the pump 11 need not be employed if the passages or piping 6 and 7 are of sufficient area to permit an adequate circulation of the water through the circulating system. When the pump is not employed, the circulation will depend wholly upon convection currents set up by the heat of the gas engine cylinder.

A difficulty ordinarily encountered in generating steam from heat imparted to the jacket or cooling water of the engine cylinders is the formation of steam pockets in the jacket or cooling passages. These pockets are spaces in which the steam displaces the water and the result is an overheating of a portion of the engine cylinder. Such steam pockets often cause portions of the cylinder to become red hot and are consequently very injurious. These difficulties are avoided by my invention by keeping the water pressure in the jacket above the pressure at which steam will form at the existing temperatures. I accomplish this by locating the tank 8 at such a height above the engine cylinder 3 that I am able to maintain a water column above the engine cylinder preferably sufficient to keep the water pressure in the jacket at or above atmospheric pressure, and I also proportion the flow of water through the jacket so that the temperature of the water will be maintained considerably below the boiling point of water at the pressure existing in the jacket. I preferably arrange the apparatus so that the water is delivered from the jacket 5 to the piping 7 at approximately 160° F. and at a pressure, as before stated at or about 14.7 lbs. absolute. Under such conditions, there will be no tendency to generate steam in the cooling passages of the engine. As the water rises in the piping 7 the pressure, due to the gravity head or column of water, diminishes and at some point along the piping the pressure exactly corresponds to the pressure of saturated steam at the temperature of the water, consequently, steam starts to form in the piping 7 and the generation of steam continues in the tank 8 which is preferably maintained at about 4 lbs. absolute pressure. It is well known that under such conditions, a part of the water is evaporated or converted into steam at the expense of the heat of the remainder so that after the water has traversed the tank 8 it is reduced in temperature some amount, for example about 7° F. The water at this reduced temperature is returned to the jacket 5 through the piping 6 by the circulating pump 11 and is again heated in the jacket to about 160° F., and this cycle is repeated indefinitely. With this arrangement, the cylinders are maintained at a safe working temperature and all parts of the cylinders are subjected to an approximately uniform temperature. With cooling apparatus ordinarily employed, the cylinder adjacent to the intake of the cooling water is apt to be very cold, while at a point immediately adjacent it is quite warm or very hot. Such variations in temperature create objectionable strains in the castings and often cause them to crack. With my invention, the only differences in temperature encountered are those due to the evolution of steam, as described, and the small temperature losses which may arise throughout the circulating system. These losses may, however, be avoided to a great extent by proper heat insulation.

It is immaterial whether the water enters the jacket 5 through the piping 6 or through the piping 7, and either arrangement may be employed by varying the operation of the pump 11. Feed water may be introduced at any convenient point in the circulating system, as for example, through a pipe 15 which communicates with the piping 6.

While I have illustrated an apparatus in which the tank 8 is located above the cooling passages or jacket 5 of the engine cylinders, I may so arrange and proportion apparatus embodying my invention that a tank 8 may be located on a level with or even below the cooling passages to which water is supplied. When such an arrangement is utilized, a circulating pump 11 will be employed in the piping 6 as illustrated, and the piping 7 will be reduced in diameter to such an extent that the necessary drop in pressure between the tank 8 and the cooling passages or jacket 5 is obtained.

Having now described my invention, what I claim is:

1. In combination with a cooling passage of an internal combustion engine, a circulating system for water communicating with said passage, and a tank located in said system and subjected to vacuum pressure and provided with a steam delivery port.

2. In combination with a cooling passage of an internal combustion engine, a circulating system for water communicating with said passage and subjected at one portion to less than atmospheric pressure, and at said passage to a gravity head corresponding approximately to atmospheric pressure.

In testimony whereof, I have hereunto subscribed my name this 5th day of July, 1910.

ALEXANDER T. KASLEY.

Witnesses:
C. W. McGHEE,
E. W. McCALLISTER.